United States Patent
Christenson et al.

(10) Patent No.: US 8,140,669 B2
(45) Date of Patent: Mar. 20, 2012

(54) RESOLVING HOSTNAMES ON A PRIVATE NETWORK WITH A PUBLIC INTERNET SERVER

(75) Inventors: David A. Christenson, Fergus Falls, MN (US); Christopher T. Gloe, Rochester, MN (US); John C. Kasperski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 12/550,588

(22) Filed: Aug. 31, 2009

(65) Prior Publication Data
US 2011/0055374 A1  Mar. 3, 2011

(51) Int. Cl.
G06F 15/173 (2006.01)
G06F 15/16 (2006.01)

(52) U.S. Cl. ......... 709/224; 709/202; 709/245; 709/249

(58) Field of Classification Search .......... 709/202–203, 709/223–224, 245–246, 249
See application file for complete search history.

(56) References Cited

U.S. PATENT DOCUMENTS

| | | | |
|---|---|---|---|
| 6,421,732 B1 | 7/2002 | Alkhatib et al. | |
| 6,463,061 B1 * | 10/2002 | Rekhter et al. | 370/392 |
| 6,563,823 B1 | 5/2003 | Przygienda et al. | |
| 6,834,302 B1 | 12/2004 | Harvell | |
| 7,359,933 B1 * | 4/2008 | Polen et al. | 709/203 |
| 7,496,685 B2 * | 2/2009 | Chen et al. | 709/245 |
| 7,562,153 B2 | 7/2009 | Biliris et al. | |
| 7,633,855 B2 | 12/2009 | Singh et al. | |
| 7,702,808 B2 * | 4/2010 | Wiget et al. | 709/245 |
| 7,797,410 B2 | 9/2010 | Westerdal | |
| 7,904,535 B2 | 3/2011 | Luo et al. | |
| 7,937,471 B2 | 5/2011 | Alkhatib et al. | |
| 2002/0016926 A1 | 2/2002 | Nguyen et al. | |
| 2002/0093915 A1 | 7/2002 | Larson | |
| 2003/0028671 A1 * | 2/2003 | Mehta et al. | 709/245 |
| 2005/0030956 A1 * | 2/2005 | Lord et al. | 370/401 |
| 2005/0286514 A1 | 12/2005 | Cheshire et al. | |
| 2009/0113521 A1 * | 4/2009 | Engdahl et al. | 726/3 |
| 2010/0325240 A1 | 12/2010 | Drako et al. | |
| 2011/0010413 A1 | 1/2011 | Christenson et al. | |
| 2011/0010463 A1 | 1/2011 | Christenson et al. | |
| 2011/0196945 A1 | 8/2011 | Alkhatib et al. | |

* cited by examiner

*Primary Examiner* — Bharat Barot
(74) *Attorney, Agent, or Firm* — James R. Nock (57) ABSTRACT

Systems, methods and articles of manufacture are disclosed for resolving hostnames on a private network with a public Internet server. One embodiment of the invention provides for a public Internet server configured to generate a private network ID when a new private network is identified, wherein the private network ID is a unique reference to all nodes within a private network and wherein the private network is comprised of one or more private DNS servers. The public internet server stores the private network ID and an IP address for at least one or more private DNS servers on the private network and sends, upon request, the private network ID to at least one of the private DNS servers.

18 Claims, 10 Drawing Sheets

RESOLVING HOSTNAMES ON A PRIVATE NETWORK WITH A PUBLIC INTERNET SERVER

BACKGROUND

The field of invention relates to Domain Name System (DNS) servers. In particular, the field of invention relates to using public DNS servers to locate private DNS servers.

In many networked computer systems, the process of locating services on a private computer network is facilitated by the use of a private DNS server. The private DNS server maintains the IP-to-hostname mappings and routes requests from a networked device to an appropriate end-point on the private network. A failure in communication between the private DNS server and the devices on the network can be a significant issue, particularly as new network services are deployed or as the network services are relocated or as clients using those network services are relocated.

Although different techniques have been proposed to resolve hostnames on a private network for new and relocated services without the use of a private DNS server, proposed techniques are manual and introduce considerable traffic onto the network. Thus, current solutions are inadequate.

SUMMARY

One embodiment of the invention includes a computer implemented method for resolving hostnames on a private network with a public Internet server. The method comprises generating, on a public Internet server, a private network ID when a new private network is identified, wherein the private network ID is a unique reference to all nodes within a private network and wherein the private network is comprised of one or more private DNS servers; storing, on the public Internet server, the private network ID and an IP address for at least one private DNS server on the private network; and sending the private network ID to at least one of the private DNS servers.

Another embodiment of the invention includes a computer readable storage medium containing a program which, when executed, performs an operation for resolving hostnames on a private network with a public Internet server. The operation may generally include generating, on a public Internet server, a private network ID when a new private network is identified, wherein the private network ID is a unique reference to all nodes within a private network and wherein the private network is comprised of one or more private DNS servers; storing, on the public Internet server, the private network ID and an IP address for at least one of the private DNS servers on the private network; and sending the private network ID to at least one of the private DNS servers.

Still another embodiment of the invention includes a system having a processor and a memory containing a program, which when executed by the processor is configured to perform an operation. The operation may generally include generating, on a public Internet server, a private network ID when a new private network is identified, wherein the private network ID is a unique reference to all nodes within a private network and wherein the private network is comprised of one or more private DNS servers; storing, on the public Internet server, the private network ID and an IP address for at least one of the private DNS servers on the private network; and sending the private network ID to at least one of the private DNS servers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
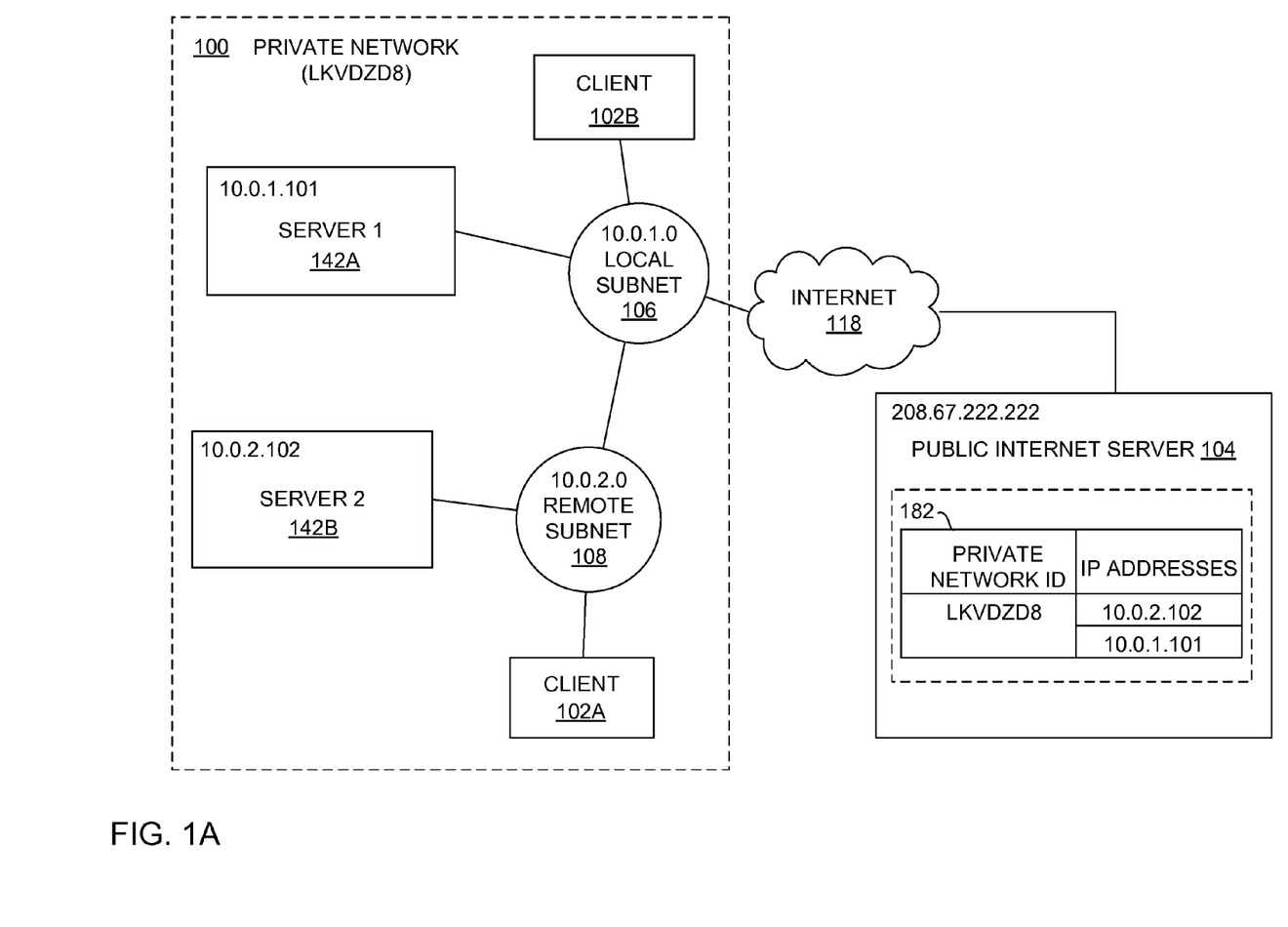
FIG. 1A is a block diagram illustrating a private network, wherein each server is configured to register an associated IP address on a public Internet server, according to one embodiment of the invention.

FIG. 1A is a block diagram illustrating an example of an embodiment of a private network 100 with a distributed DNS server configuration, wherein each server computer (server) on the private network is configured to register its associated IP address on a public Internet server. In an alternative embodiment, at least one server on the private network is configured to register its address on the public internet server. The private network 100 includes two client computers (clients), a first client 102A and a second client 102B, connected via a network to a plurality of servers.

In particular, the private network includes server 1 142A, wherein server 1 is associated with IP address 10.0.1.101, and server 2 142B, wherein server 2 is associated with IP address 10.0.2.102. Server 1 142A is connected to the first client 102A via local subnet 106 and is connected to the second client 102B via remote subnet 108 via local subnet 106. Server 2 142B is connected to the second client 102B via remote subnet 108 and is connected to the first client via local subnet 106 via remote subnet 108. The private network also includes a network connection to a public Internet server 104, associated with IP address 208.67.222.222, connected via the Internet 118 via local subnet 106.

The public Internet server 104 includes a private network DNS database 182, wherein the private network DNS database 182 maintains a record of IP addresses of the servers on the private network and an associated private network ID unique to each private network.

Figure 1B:
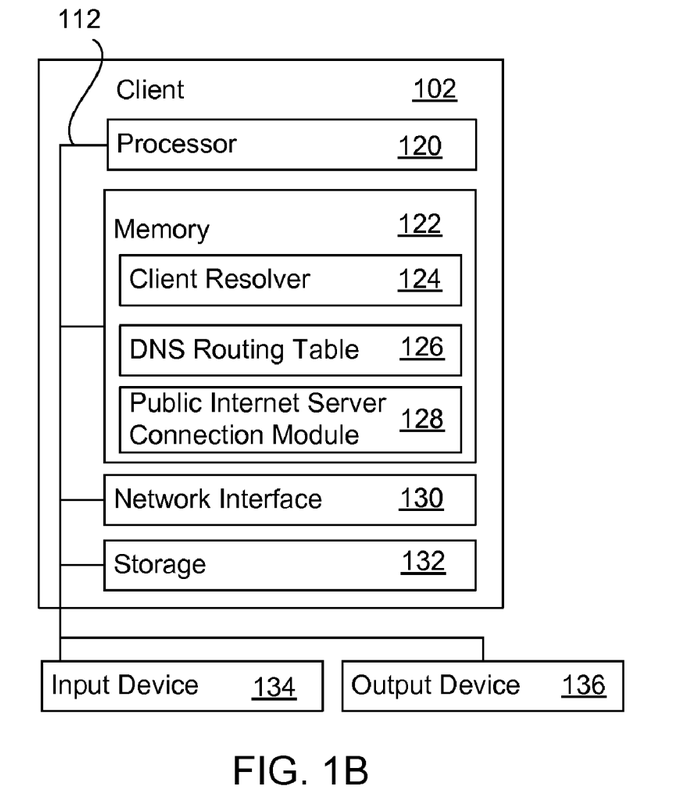
FIG. 1B is a block diagram illustrating in detail the client of FIG. 1A, according to one embodiment of the invention.

FIG. 1B is a block diagram illustrating the client of FIG. 1A, according to one embodiment of the invention.

As shown, the client 102 generally includes a processor 120 connected via a bus 112 to a memory 122, a network interface device 130, a storage 132, an input device 134, and an output device 136. The client 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 122 may be a random access memory. While the memory 806 is shown as a single entity, it should be understood that the memory 122 may in fact comprise a plurality of modules, and that the memory 122 may exist at multiple levels, from high speed registers and caches to lower speed but larger DRAM chips.

As shown, the memory 122 includes a client resolver 124, a DNS routing table 126, and a public internet server connection module 128. The client resolver 124, when executed on processor 120, retrieves information associated with a received hostname query. The DNS routing table 126 is configured to keep a record of one or more DNS servers on the private network. The public internet server connection module 128 manages the connection between the client and the public Internet server and requests information as described in further detail in FIG. 1C.

The network interface device 130 may be any entry/exit device configured to allow network communications between the client 102 and the server 142 via the network. For example, the network interface device 130 may be a network adapter or other network interface card (NIC).

The storage 132 may be a hard disk drive storage device. Although the storage 132 is shown as a single unit, the storage 132 may be a combination of fixed and/or removable storage devices, such as fixed disc drives, floppy disc drives, tape drives, removable memory cards, or optical storage. The memory 128 and the storage 132 may be part of one virtual address space spanning multiple primary and secondary storage devices.

The input device 134 may be any device for providing input to the client 102. For example, a keyboard, keypad, light pen, touch-screen, track-ball, or speech recognition unit, audio/video player, and the like may be used.

The output device 136 may be any device for providing output to a user of the client 102. For example, the output device 816 may be any conventional display screen or set of speakers, along with their respective interface cards, i.e., video cards and sound cards.

Figure 1C:
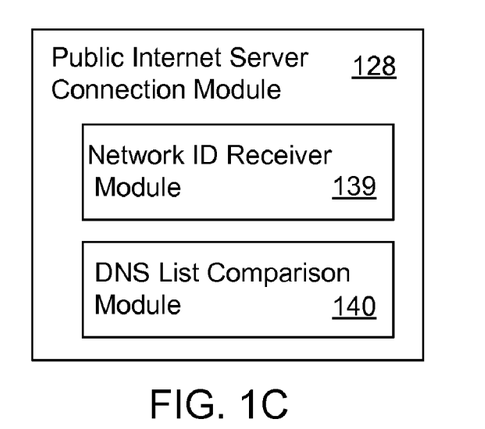
FIG. 1C is a block diagram illustrating in detail the public Internet server connection module of FIG. 1B.

FIG. 1C is a block diagram illustrating in detail the public Internet server connection module 128 of FIG. 1B. The public Internet server connection module 128 includes a network ID receiver module 139 and a DNS list comparison module 140.

In one embodiment, the network ID receiver module 139 is configured to discover the private network ID for the private network. The network ID receiver module 139 may be configured to request the private network ID from a DNS server on the private network. If the network ID receiver module 139 fails to identify a private network ID from the DNS server, the network ID receiver module 139 may be further configured to request the private network ID from a client on the private network. In an alternative embodiment, the network ID receiver module 139 is configured to browse the network for broadcasts from one or more DNS servers on the private network, wherein the broadcast includes the private network ID.

In one embodiment, the DNS list comparison module 140 is configured to request a current copy of the private network DNS server list from the public internet server (hereinafter "current DNS server list") and is further configured to compare the current DNS server list to a list of IP-to-hostname mappings in the DNS routing table 126 (hereinafter "client DNS server list"). If the current DNS server list differs from the client DNS server list, the DNS list comparison module 140 replaces the client DNS server list with the current DNS server list. If both are the same, the DNS list comparison module does not update the client DNS server list.

Figure 1D:
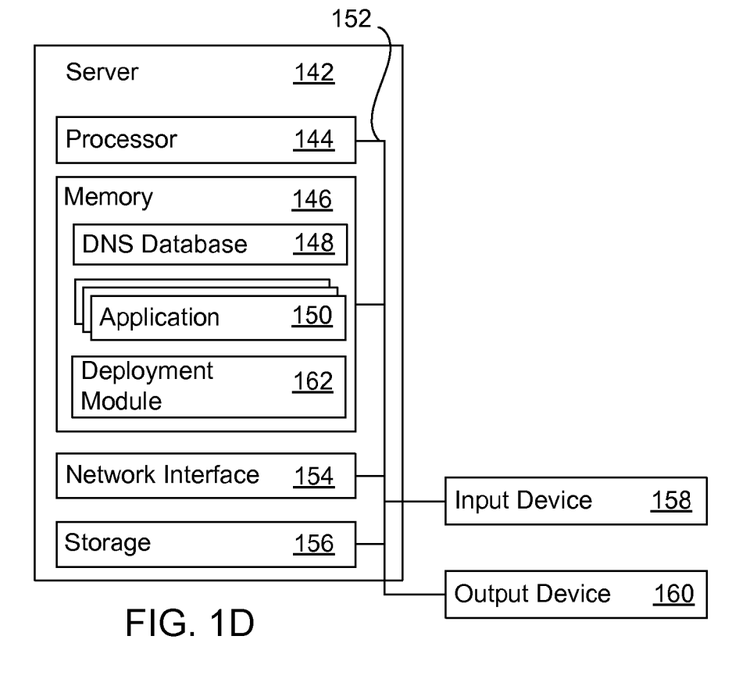
FIG. 1D is a block diagram illustrating in detail the server of FIG. 1A, according to one embodiment of the invention.

FIG. 1D is a block diagram illustrating in detail the server 142 of FIG. 1A, according to one embodiment of the invention.

Similar to the client 102 of FIG. 1B, the server 142 generally includes a processor 144 connected via a bus 152 to a memory 146, a network interface device 154, a storage 156, an input device 158, and an output device 160. The processor 144 could be any hardware processor used to perform an embodiment of the invention.

As shown, the memory 146 includes a DNS database 148, wherein the DNS database includes a list of application hostnames for applications installed on the server 142, one or more hosted applications 150, and a deployment module 162. In addition, the DNS database includes a list of interface hostnames. In an alternative embodiment, the DNS database 148 is stored in storage 156.

Like the network interface device 130 of FIG. 1B, the network interface device 154 may be any entry/exit device configured to allow network communications between the client 102 and the server 142 via the network.

Like the storage 132 of FIG. 1B, the storage 156 may be a hard disk storage device and may be a combination of fixed and/or removable storage devices, such as fixed disc drives, floppy disc drives, tape drives, removable memory cards, or optical storage.

Like the input device 134 of FIG. 1B, the input device 158 may be any device for providing input to the client 102 and the output device 160 may be any device for providing output to a user of the server 142.

Figure 1E:
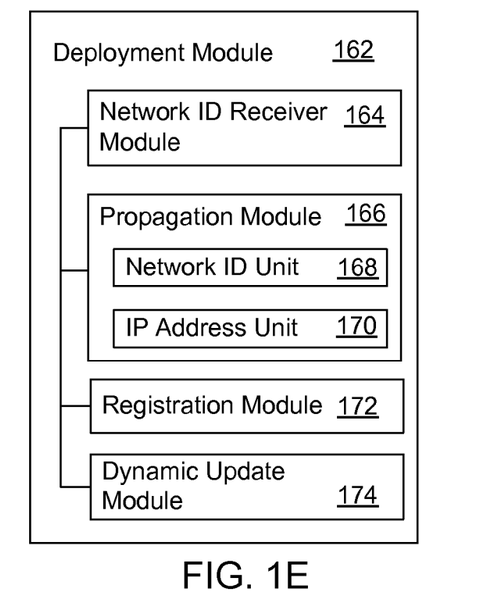
FIG. 1E is a block diagram illustrating in detail the deployment module of FIG. 1D, according to one embodiment of the invention.

FIG. 1E is a block diagram illustrating in detail the deployment module 162 of FIG. 1D. The deployment module 162 includes a network ID receiver module 164, a propagation module 166, a registration module 172, and a dynamic update module 174.

In one embodiment, the network ID receiver module 172 is configured to discover the private network ID for the private network similar to the network ID receiver module 139 in the public Internet connection module 138 of FIG. 1C. The network ID receiver module 172 is configured to request the private network ID from a DNS server on the private network. If the network ID receiver module 172 fails to identify a private network ID from the DNS server, the network ID receiver module 172 may be further configured to request the private network ID from a client on the private network. In an alternative embodiment, the network ID receiver module 172 is configured to browse the network for broadcasts from one or more DNS servers on the private network, wherein the broadcast includes the private network ID.

In one embodiment, the propagation module 166 is configured to broadcast the private network ID and its associated IP address onto the private network, wherein the private network ID and the IP address is stored in the network ID unit 168 and the IP address unit 170, respectively. In an alternative embodiment, if the server is a part of a region of servers, the propagation module 166 may be further configured to send the private network ID and its associated IP address to at least one of the servers in the region of servers to set up delegation records as appropriate. In such an embodiment, any of the servers within the region of servers may respond to a query request addressed to another server within the region.

In one embodiment, the registration module 164 is configured to send a registration message to the public Internet server when first introduced to the private network, wherein the registration message includes, at least, the private network ID and the IP address associated with the server. The registration module 164 may be further configured to receive from the public Internet server a list of IP addresses associated with a region of servers, if the public Internet server determines that the receiving server is part of a region of servers. For example, the public Internet server may receive a registration message that includes an ID associated with a private network region and may compare the ID with records containing the same ID and return the IP-to-hostname mappings for the respective IDs to the server.

In one embodiment, the dynamic update module 174 is configured to send an update message to the public Internet server when a user changes the IP address associated with the server. The dynamic update module 174 may be further configured to send an update message to an associated region of servers if the sending server is a part of the region of servers. In such an embodiment, the region of servers update stored delegation records to reflect the changed IP address of the sending server.

In an alternative embodiment, both the registration module and the dynamic update module are configured to communicate with the public Internet server through a secure protocol such as DNSSEC (Domain Name System Security Extensions) or TSIG (Transaction Signature), for example.

Figure 1F:
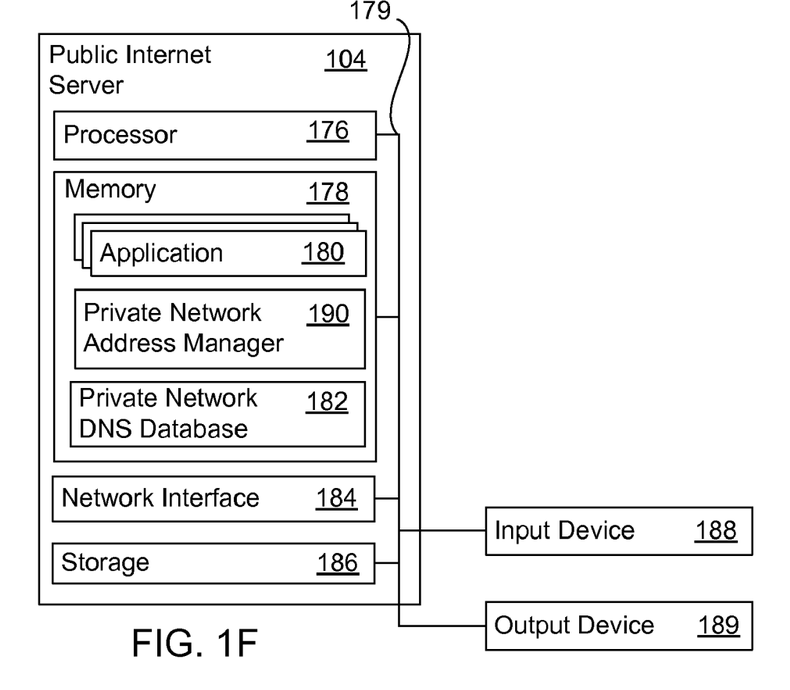
FIG. 1F is a block diagram illustrating in detail the public Internet server of FIG. 1A, according to one embodiment of the invention.

FIG. 1F is a block diagram illustrating in detail the public Internet server 104 of FIG. 1A, according to one embodiment of the invention.

Similar to the client 102 of FIG. 1B, the public internet server 104 generally includes a processor 176 connected via a bus 179 to a memory 178, a network interface device 184, a storage 186, an input device 188, and an output device 189. The processor 176 could be any hardware processor used to perform an embodiment of the invention.

As shown, the memory 178 includes one or more hosted applications 180, a private network address manager 190, and a private network DNS database 148. In an alternative embodiment, the DNS database 148 is stored in storage 156.

Like the network interface device 130 of FIG. 1B, the network interface device 184 may be any entry/exit device configured to allow network communications between the client 102 and the server 142 via the network.

Like the storage 132 of FIG. 1B, the storage 186 may be a hard disk storage device and may be a combination of fixed and/or removable storage devices, such as fixed disc drives, floppy disc drives, tape drives, removable memory cards, or optical storage.

Like the input device 134 of FIG. 1B, the input device 188 may be any device for providing input to the client 102 and the output device 189 may be any device for providing output to a user of the server 142.

Figure 1G:
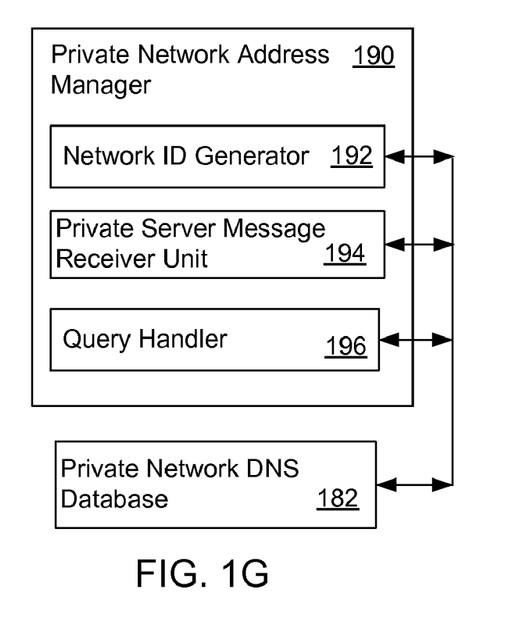
FIG. 1G is a block diagram illustrating in detail the private network address manager of FIG. 1F, according to one embodiment of the invention.

FIG. 1G is a block diagram illustrating in detail the private network address manager 190 of FIG. 1F. The private network address manager 190 includes a network ID generator 192, a private server message receiver unit 194, and a query handler 196.

In one embodiment, the network ID generator 192 is configured to generate a private network ID, wherein the network ID is a unique reference to all nodes within the private network, when a server associated with an unregistered private network (hereinafter "initiating server") first registers a private network not previously registered on the public Internet server. The network ID generator 192 is configured to send the private network ID to the initiating server after receiving a query from the initiating server. The network ID generator 192 is further configured to create an A or AAAA record including the network ID, a domain name and the IP address for the initiating server in the private network DNS database 182.

In one embodiment, the private server message receiver unit 194 is configured to receive registration and update messages from one or more servers on the private network. The private server message receiver unit 194 is further configured to identify the network ID for the received message and update the private network DNS database 182 with a new record or update a preexisting record, wherein the record is an IPv4 A resource record or an IPv6 AAAA resource record and includes the network ID, the domain name, and the IP address associated with the server sending the message.

In one embodiment, the query handler 196 is configured to receive a query request from a client, wherein the query request includes a private network ID and a request for a list of all servers associated with the private network ID. The query handler 196 is further configured to send a response to the client, wherein the response includes the list of all servers associated with the received private network ID. In an alternative embodiment, the received query and the response from the public internet server are communicated via a secure protocol such as DNSSEC or TSIG, for example.

It should be noted that often the servers in the private network will be behind a network firewall and as a result will, in many cases, require the private network servers to initiate communication with the public Internet server to receive communication. As a result, the embodiments herein describe the public server as first receiving a query from the private network server and subsequently responding to the private network server. Those skilled in the art will appreciate alternative embodiments that permit the public Internet server to initiate communication with the private network servers.

Figure 2:
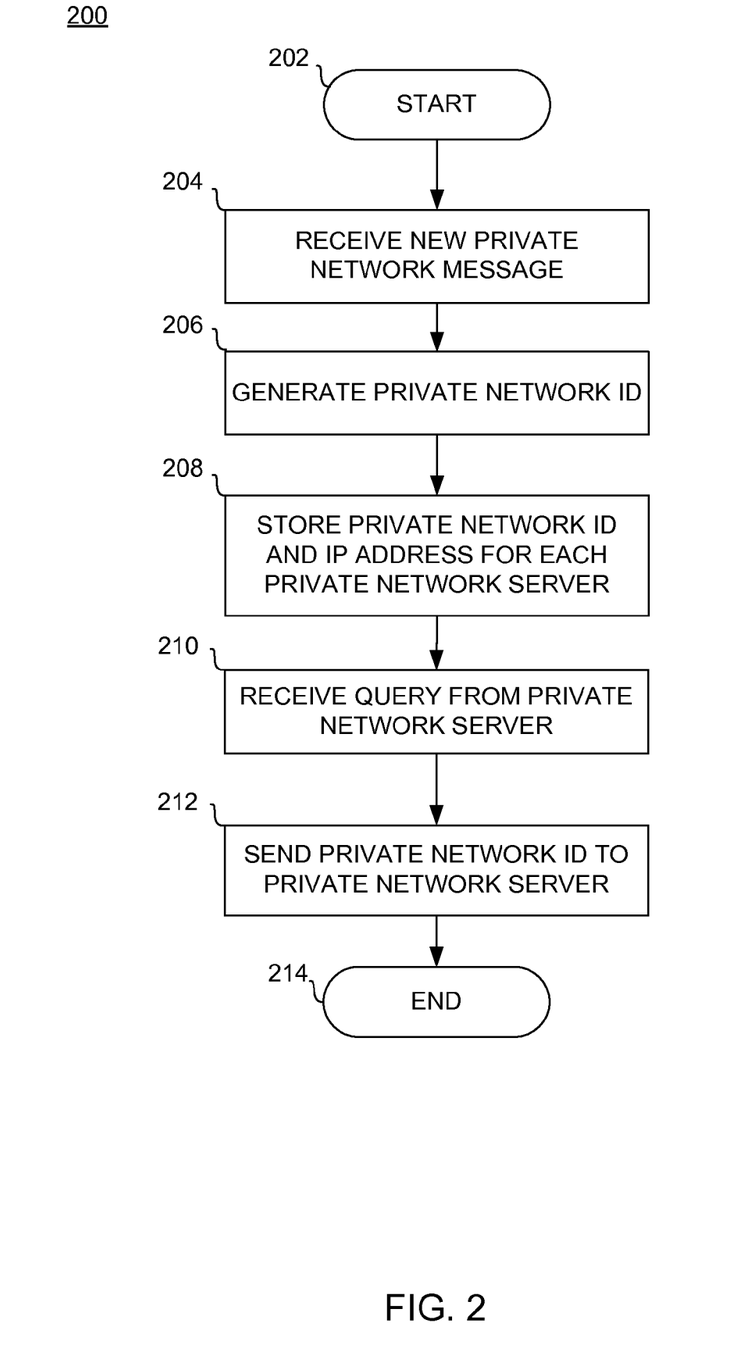
FIG. 2 is a flowchart illustrating the operation of the public Internet server of FIG. 1A, according to one embodiment of the invention.

Additional detail describing the operation of the private server message receiver unit 194 and the query handler 196 is provided in FIG. 2 and the associated descriptions.

FIG. 2 is a flowchart illustrating, in general, the operation of the public Internet server 104 of FIG. 1A.

As shown, the process begins at step 202. At step 204, the public Internet server receives a new private network message, wherein the new private network message reports the presence of a new private network and includes one or more IP addresses associated with the servers on the private network. At step 206, the public Internet server generates a private network ID unique to the private network. At step 208, the public Internet server stores the private network ID in its private network DNS database and pairs the private network ID with an IP address associated with a private network server, as defined in the new private network message. At step 210, the public Internet server receives a query from a private network server, wherein the query includes a request for the private network ID. In one embodiment, the private network server is initially configured to include the public internet server IP address or alternatively the public internet server hostname. In addition, the private network server is initially configured to include a unique key, wherein the unique key is designed to provide access to the private network ID on the public Internet server. At step 212, the public Internet server sends the private network ID to the private network servers. The process ends at step 214.

Figure 3:
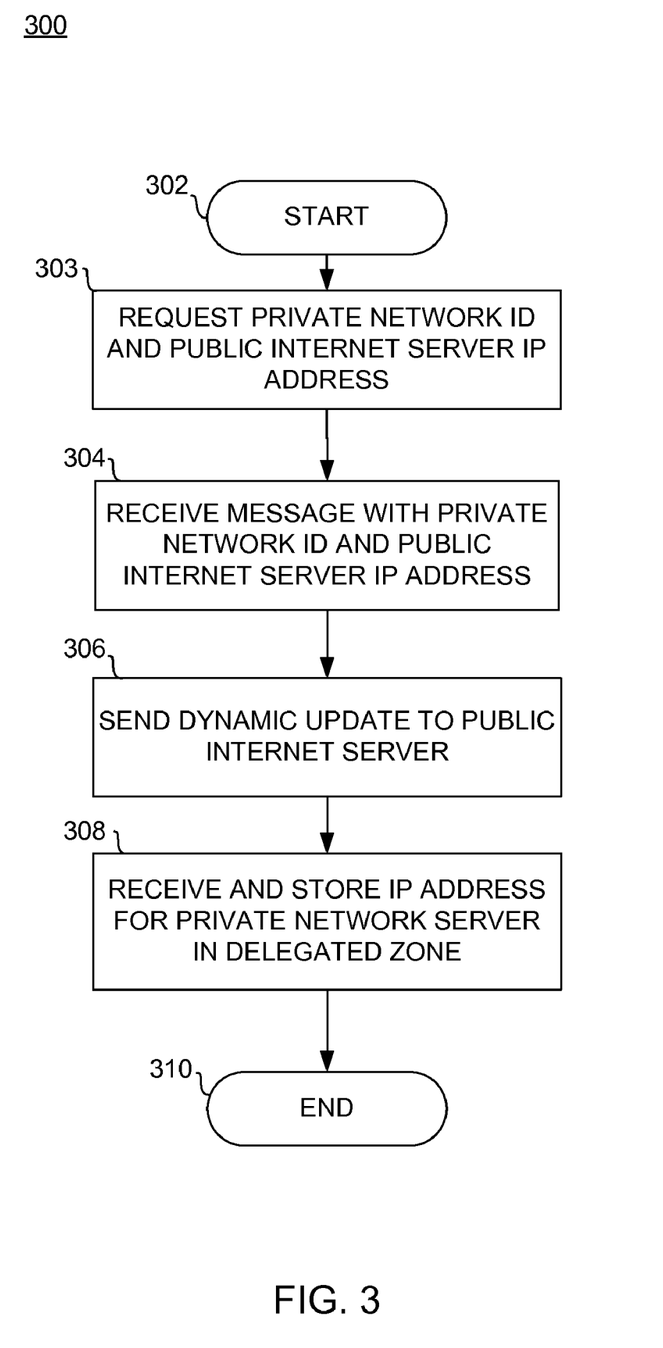
FIG. 3 is a flowchart illustrating a process of introducing a new server onto the private network, according to one embodiment of the invention.

FIG. 3 is a flowchart illustrating an embodiment of a process of introducing a new server onto the private network.

Generally, as a new private network server is deployed, the system sends a dynamic update to the public Internet server. As servers are deployed onto the same network, the public Internet server stores the IP address of the private network server, wherein all servers on the same private network are associated with the same private network ID.

As shown, the process begins at step 302. At step 303, a recently deployed server requests a private network ID and a public Internet server IP address from a networked device on the private network. At step 304, a recently deployed server receives a message with the private network ID and the public Internet server IP address. In one embodiment, the recently deployed server receives the message from another server on the private network. In an alternative embodiment, the recently deployed server receives the message from a client on the private network. At step 306, the recently deployed server sends a dynamic update to the public Internet server, wherein the dynamic update includes the associated IP address of the recently deployed server and the private network ID. At step 308, the recently deployed server receives and stores an IP address for a private network server within its region, enabling the server to forward future hostname query requests to the server associated with the received IP address. The process ends at step 310.

Figure 4:
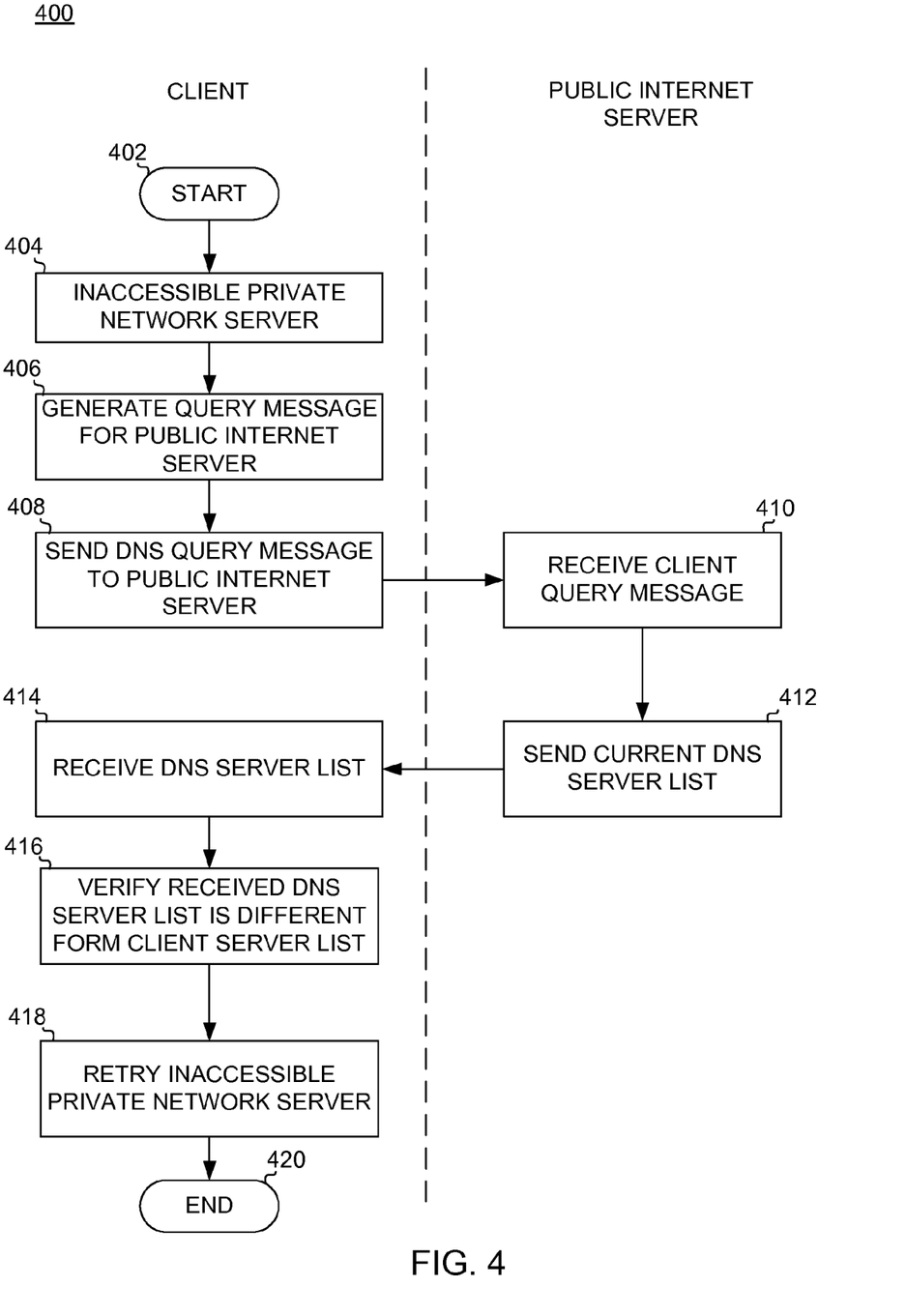
FIG. 4 is a flowchart illustrating a process of retrieving an updated IP address from a public Internet server after the client discovers an inaccessible private network server, according to one embodiment of the invention.

FIG. 4 is a flowchart illustrating, in general, an embodiment of a process of retrieving an updated IP address from a public Internet server after the client discovers an inaccessible private network server. For example, if the client is unable to resolve a hostname, the client may be configured to query the public Internet server as described in further detail below.

As shown, the process begins at step 402. At step 404, the client identifies an inaccessible private network server, wherein an inaccessible private network server may be a private server that fails to respond to a client query. At step 406, the client generates a query message, wherein the message includes the private network ID. At step 408, the client sends the query message to a public Internet server. In one embodiment, the client is configured to limit the messages to a predefined frequency, such that not all failed client queries result in a query message to the public Internet server. At step 410, the client receives the client query message and, at step 412, responds with a current DNS server list, wherein the current DNS server list includes a list of private network servers associated with the received private network ID. At step 414, the client receives the current DNS server list and, at step 416, the client verifies that the received DNS server list is different from the list of DNS server records on the client. At step 418, the client retries the inaccessible private network server. A step 420, the process ends.

Figure 5:
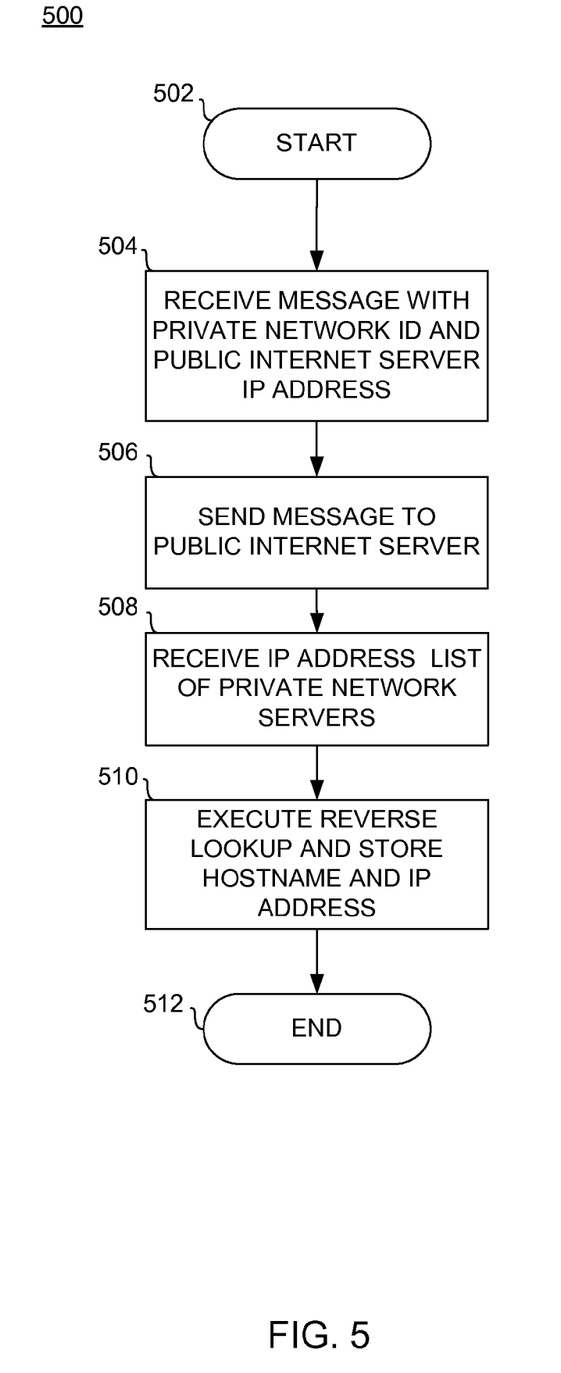
FIG. 5 is a flowchart illustrating a process of retrieving an IP address list from a public Internet server after a new client is introduced onto the private network, according to one embodiment of the invention.

FIG. 5 is a flowchart illustrating, in general, an embodiment of a process of retrieving an IP address list from a public Internet server after a new client is introduced onto the private network.

As shown, the process begins at step 502. At step 504, the new client receives a message, wherein the message includes a private network ID and a public Internet server IP address. In one embodiment, the client receives the message from a client on the private network. In an alternative embodiment, the client receives the message from a server on the private network. At step 506, the client sends a message to the public Internet server, wherein the message includes a request for a list of IP addresses associated with all servers on the private network (IP address list). At step 508, the client receives the IP address list. At step 510, the client executes a reverse lookup using the received IP address list and stores the IP address and hostname pair in a local DNS routing table.

Figure 6:
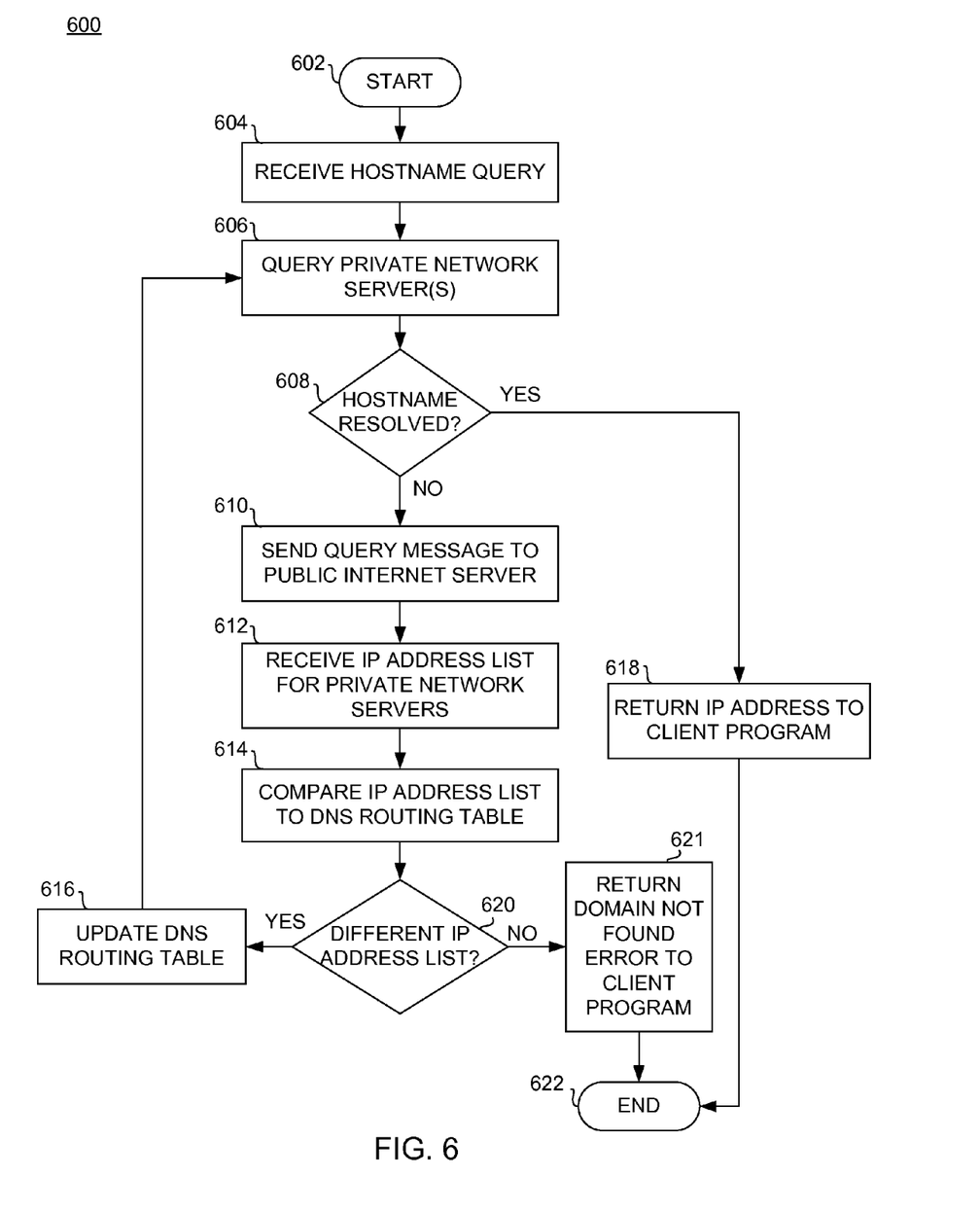
FIG. 6 is a flow chart illustrating a system that handles hostname resolution, according to one embodiment of the invention.

FIG. 6 is a flow chart illustrating an embodiment of a system that handles hostname resolution and that makes use of a public Internet server. In one embodiment the system performing the process is a client resolver executed on a processor of a client.

As shown, the process begins at step 602. At step 604, the system receives a hostname query and control passes to step 606. At step 606, the system sends the received query to the servers on the private network and control passes to step 608. At step 608, the system determines if the hostname has been resolved. If YES, control passes to step 618. At step 618, the system returns the IP address to the client program and control passes to step 622, the end of process 600.

If NO, control passes to step 610 and the system sends a query message to the public Internet server. In one embodiment, the client is configured to limit the messages to a predefined frequency, such that not all failed client queries result in a query message to the public Internet server. At step 612, the system receives an IP address list of the private network servers. At step 614, the system compares the IP address list to the DNS routing table stored on the client and control passes to step 620. At step 620, the system determines if the IP address list is different from the list of IP addresses in the DNS routing table. If YES, control passes to step 616. At step 616, the DNS routing table on the client is updated and control passes to step 606, where the process is repeated. If NO, control passes to step 621, where the system returns a domain not found error to the client program and control passes to step 622, where the process ends.

Figure 7:
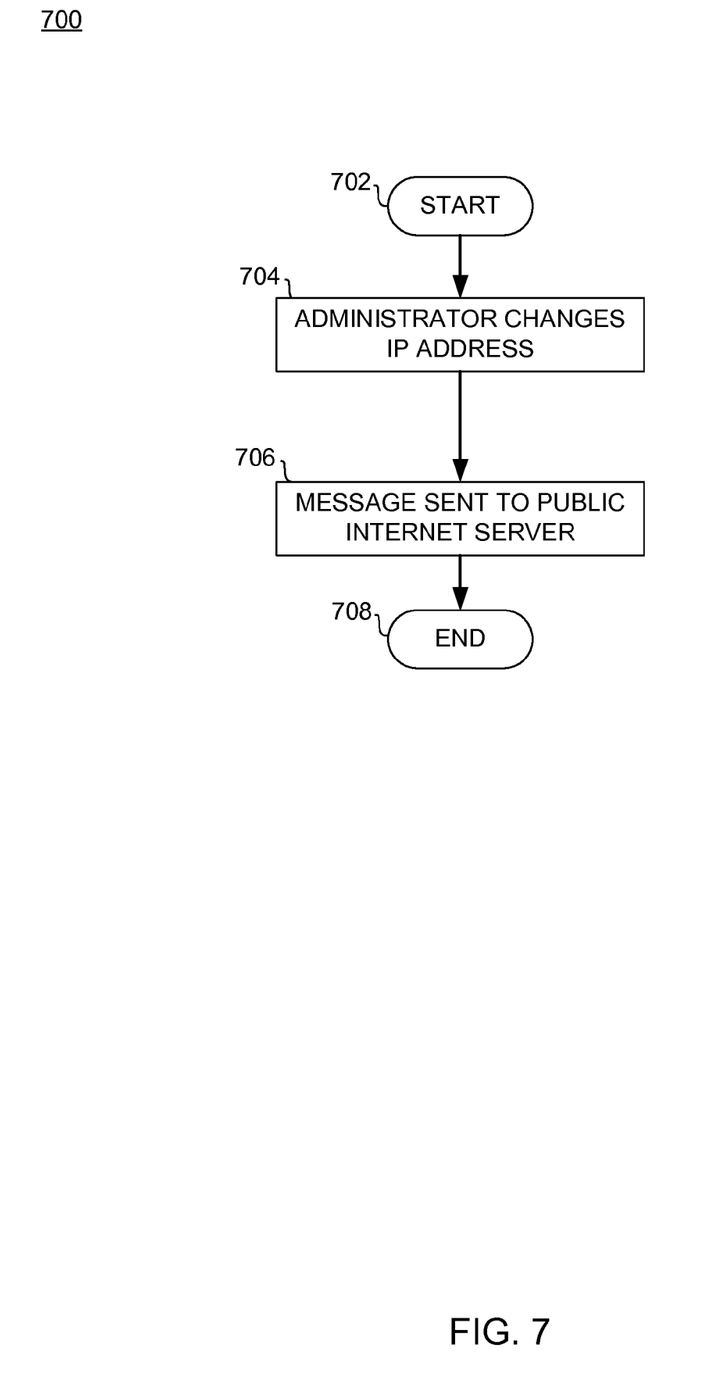
FIG. 7 is a flowchart illustrating a process of updating the IP address on an existing private network server, according to one embodiment of the invention.

FIG. 7 is a flowchart illustrating an embodiment of a process of updating the IP address on an existing private network server. As shown, the process begins at step 702. At step 704, the administrator changes the IP address of a server. At step 706, the system sends a message to the public Internet server, wherein the message includes the private network ID, the updated IP address, and the old IP address. At step 708, the process ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, reference is made to private network servers, including distributed DNS servers on the private network. Those skilled in the art will appreciate that the private network servers described in the embodiments herein may serve multiple purposes, wherein no server is exclusively dedicated to managing domain names or hosting applications. At the very least, the private network servers described herein may function both as an application server and as a DNS server. In addition, reference is made to local subnet. It should be understood that the term local subnet is used interchangeably with the term LAN segment to mean that portion of a local area network wherein every device communicates using the same physical layer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for resolving hostnames on a private network with a public Internet server, comprising configuring one or more processors to perform an operation, comprising:

generating, on a public Internet server, a private network ID when a new private network is identified, wherein the private network ID is a unique reference to all nodes within a private network and wherein the private network is comprised of one or more private DNS servers;

storing, in a private network DNS database on the public Internet server, the private network ID and an associated IP address for at least one or more private DNS servers on the private network; and sending the private network ID to at least one of the private DNS servers.

2. The computer implemented method of claim 1, wherein the private DNS servers propagate the networked ID to all networked devices on the private network.

3. The computer implemented method of claim 1, further comprising updating the public Internet server when one of the IP addresses associated with one of the private DNS servers is modified.

4. The computer implemented method of claim 3, further comprising updating the public Internet server with a new IP address when a new private DNS server is connected to the private network, wherein the new IP address is associated with the new private DNS server.

5. The computer implemented method of claim 4, further comprising:
receiving a query and the private network ID from a networked device on the private network; and
responding with a list of the IP addresses associated with the private DNS servers on the private network associated with the private network ID received.

6. The computer implemented method of claim 1, wherein the public Internet server only sends the private network ID upon request, if the private network associated with the private network ID is behind a firewall.

7. A non-transitory computer readable storage medium containing a program which, when executed, performs an operation for resolving hostnames on a private network with a public Internet server, comprising:
generating, on a public Internet server, a private network ID when a new private network is identified, wherein the private network ID is a unique reference to all nodes within a private network and wherein the private network is comprised of one or more private DNS servers;
storing, in a private network DNS database on the public Internet server, the private network ID and an associated IP address for at least one or more private DNS servers on the private network; and
sending the private network ID to at least one of the private DNS servers.

8. The computer readable storage medium of claim 7, wherein the private DNS servers propagate the networked ID to all networked devices on the private network.

9. The computer readable storage medium of claim 8, further comprising updating the public Internet server when one of the IP addresses associated with one of the private DNS servers is modified.

10. The computer readable storage medium of claim 9, further comprising updating the public Internet server with a new IP address when a new private DNS server is connected to the private network, wherein the new IP address is associated with the new private DNS server.

11. The computer readable storage medium of claim 10, further comprising:
receiving a query and the private network ID from a networked device on the private network; and
responding with a list of the IP addresses associated with the private DNS servers on the private network associated with the private network ID received.

12. The computer readable storage medium of claim 7, wherein the public Internet server only sends the private network ID upon request, if the private network associated with the private network ID is behind a firewall.

13. A system, comprising:
a processor; and
a memory containing a program, which when executed by the processor is configured to perform an operation for resolving hostnames on a private network with a public Internet server, comprising:
generating, on a public Internet server, a private network ID when a new private network is identified, wherein the private network ID is a unique reference to all nodes within a private network and wherein the private network is comprised of one or more private DNS servers;
storing, in a private network DNS database on the public Internet server, the private network ID and an associated IP address for at least one or more private DNS servers on the private network; and
sending the private network ID to at least one of the private DNS servers.

14. The system of claim 13, wherein the private DNS servers propagate the networked ID to all networked devices on the private network.

15. The system of claim 13, further comprising updating the public Internet server when one of the IP addresses associated with one of the private DNS servers is modified.

16. The system of claim 14, further comprising updating the public Internet server with a new IP address when a new private DNS server is connected to the private network, wherein the new IP address is associated with the new private DNS server.

17. The system of claim 15, further comprising:
receiving a query and the private network ID from a networked device on the private network; and
responding with a list of the IP addresses associated with the private DNS servers on the private network associated with the private network ID received.

18. The system of claim 13, wherein the public Internet server only sends the private network ID upon request, if the private network associated with the private network ID is behind a firewall.

\* \* \* \* \*